G. J. WILLETT.
SAFETY LOCK FOR BELT SHIFTERS.
APPLICATION FILED MAR. 8, 1913.
1,165,738.
Patented Dec. 28, 1915.
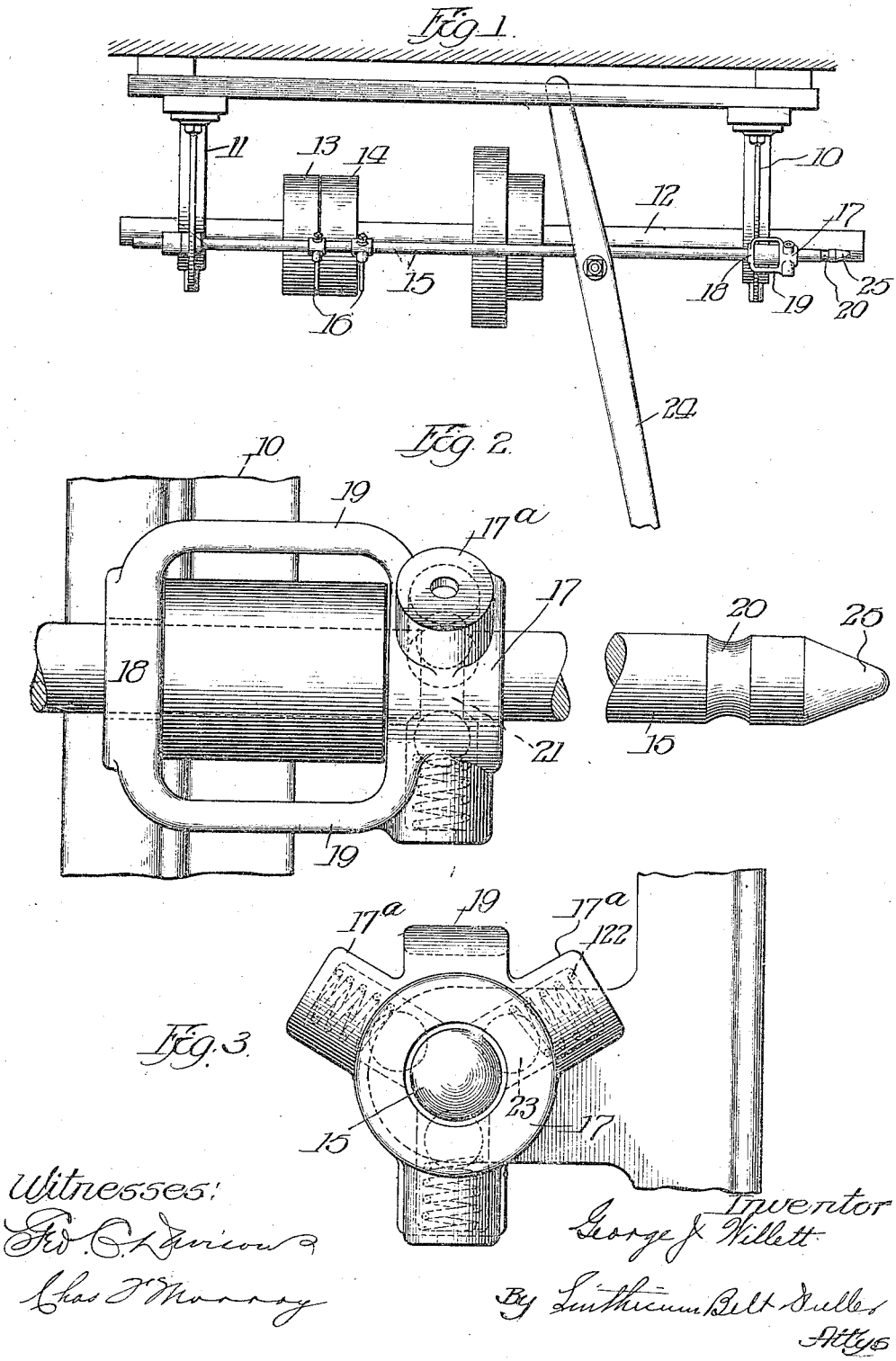

UNITED STATES PATENT OFFICE.

GEORGE J. WILLETT, OF MILWAUKEE, WISCONSIN.

SAFETY-LOCK FOR BELT-SHIFTERS.

1,165,738.

Specification of Letters Patent.

Patented Dec. 28, 1915.

Application filed March 8, 1913. Serial No. 752,933.

*To all whom it may concern:*

Be it known that I, GEORGE J. WILLETT, a citizen of the United States, and resident of Milwaukee, in the county of Milwaukee and State of Wisconsin, have invented certain new and useful Improvements in Safety-Locks for Belt-Shifters, of which the following is a specification.

My invention relates to machine shop appliances and has particular reference to a novel safety device for attachment to belt shifters.

In all shops and factories where power is employed it is customary to connect machines to a line shaft by means of belts and to provide tight and loose pulleys with means for shifting the belt from one to the other of the pulleys whereby power is supplied to or disconnected from the machine in question.

A common source of danger to employees while working on the machines from which the source of power is disconnected because of the power belt coöperating with the loose pulley on the line shaft, is that the belt may creep over onto the tight pulley and cause the starting of the idle machine frequently causing serious injury to the workman.

An object of my invention is to provide a safety device whereby when the belt is shifted to the tight or loose pulley it will remain in that position without the possibility of its creeping onto another pulley. Another advantage in such construction is in that the belt is firmly held on the tight pulley when the machine is in operation without the possibility of the belt creeping off the tight and onto the loose pulley thus causing the stoppage of the machine. This occurs not infrequently.

My invention will be more readily understood by reference to the accompanying drawings, wherein;

Figure 1 is a front elevation of a line shaft having tight and loose pulleys and a belt shifter to which my improvement has been attached; Fig. 2 is a view similar to that of Fig. 1, with the safety device considerably enlarged, and, Fig. 3 is an end elevation of the construction shown in Fig. 2.

Referring more particularly to the drawings, it will be seen that I provide the usual shaft hangers 10, 11, in which is mounted a line shaft 12, having tight and loose pulleys 13, 14. A belt shifter shaft 15, is mounted in suitable bearings in the shaft hangers 10, 11, and is provided with the belt contacting fingers 16, between which the belt runs.

My safety device consists of an integral casting having a substantially circular apertured end portion 17, from which radial housings 17ª project. A second apertured part 18 is connected to the part 17 by means of the connecting bars or loops 19. The bearing member in which the belt shifter shaft 15 is mounted is held between the two members 17, 18, thus preventing the removal of the safety device without removing the belt shifter shaft. The shaft at its ends is provided with circumferential grooves 20, 21, these grooves being located a distance apart equal to the width of the belt to be shifted. Within the housings 17ª are placed springs 22, coöperating with balls 23, which balls fit the grooves 20, in the shaft 15, and are spring-held therein. It will be seen that upon moving the belt shifter lever 24 to the left as viewed in Fig. 1, the shaft will be moved and the belt shifted only upon displacing the balls 23 and compressing the springs 22. When the proper point has been reached the balls will drop within the groove 20, and securely hold the shifter in such position until displaced by the reverse action of the belt shifter lever. In order to assist in inserting the belt shifter shaft 15 in the aperture in the part 17 and thereby displacing the balls 23, I prefer to reduce the end of the shaft making it pointed, as shown at 25. It will be seen that by this construction the belt shifter is held in either adjusted position without the possibility of accidental displacement.

Modifications may be made in the construction shown and such modifications as are within the spirit of my claim I consider within the scope of my invention.

I claim:

A locking attachment for belt shifters, comprising a U-shaped frame with its arms spaced apart and provided with openings, the space between the arms permitting it to embrace the opposite sides of a hanger bracket and the openings adapted to receive the sliding rod of the belt shifter, there being a longitudinal opening through one of the arms of the frame, and a spring pressed ball contained in such longitudinal opening and adapted to engage one or more notches on the sliding rod for holding the sliding rod against accidental longitudinal movement, substantially as described.

GEORGE J. WILLETT.

Witnesses:
CHARLES P. SCHWARTZ,
O. M. DENNEY.